2,955,375
FISHING LURE
Raymond P. Mitchell, 612 N. Main St., Danville, Va.
Filed June 16, 1958, Ser. No. 742,422
2 Claims. (Cl. 43—17.6)

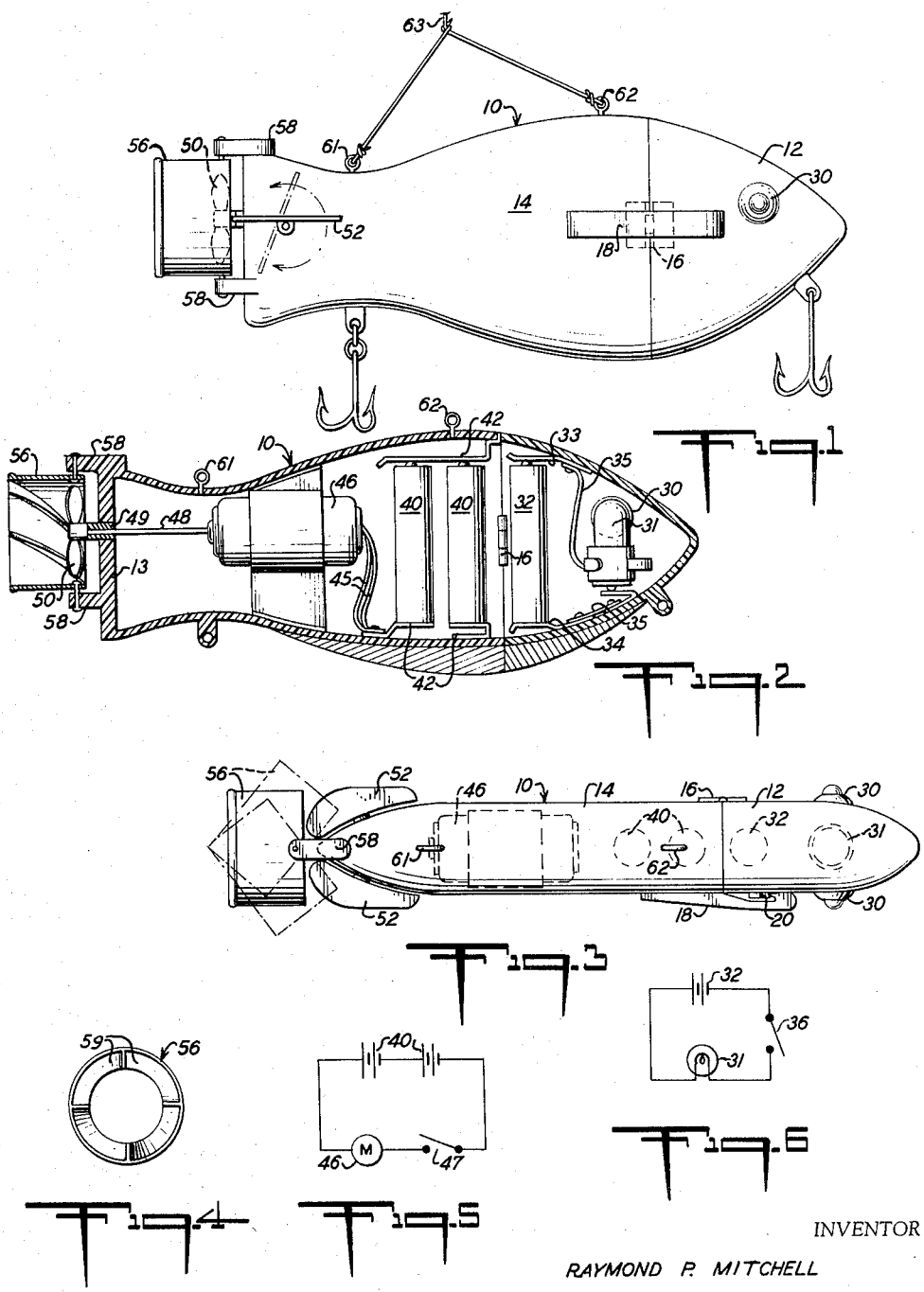

This invention relates to a fishing lure, and particularly to fishing lures of the self-propelled type.

An object of this invention is to provide a self-propelled fishing lure with a propeller which extends outside the body of the lure and providing this propeller with a protecting member.

A further object of this invention is to provide such a lure with separate power means for the propeller and the lure's illuminated eyes.

A still further object of this invention is to place depth control means near the propeller to give better means of controlling the lure.

Another object of this invention is to provide protective means for the protruding propeller which will give directional guidance to the lure, and will not detract unnecessarily from the lure's fish-like appearance.

These and other objects of the invention will become more readily apparent from the following detailed description of the invention taken in conjunction with the accompanying drawings in which:

Fig. 1 is a side-elevational view of the invention;
Fig. 2 is a longitudinal cross-sectional view showing the major elements in elevation;
Fig. 3 is a top view;
Fig. 4 is an endwise view of the cylindrical directional guide and propeller protector;
Fig. 5 is a diagram of the propeller motor circuit; and
Fig. 6 is a diagram of the lighted eyes circuit.

Referring now to the drawings in detail, this invention relates to improvements in a fish lure having a body portion 10, which consists of front end portion 12, and a rear end portion 14. Portions 12 and 14 are hinged together by hinge 16, and may be held in the closed position by the somewhat resilient clasp 18, engaging the nub 20 on portion 12.

On either side of the front end portion 12 are placed eyes 30 of a transparent crystalline material. In the interior of the front section is placed a bulb 31, and a battery 32. The battery is clamped in position by two resilient holders 33 and 34, and appropriate lead-in wires 35 carry the current to bulb 31. This circuit is shown in Fig. 6. This circuit can be made inoperative by merely opening an appropriately placed switch 36 or removing battery 32. In daylight fishing it is unnecessary to have the bulb operating because rays of sunshine will be amply reflected due to the crystalline nature of eyes 30. A disadvantage of the prior art in this field was that power was constantly being used to operate the bulb, when, in fact, light is only necessary in nighttime fishing.

The rear portion 14 has in its interior batteries 40 held in their proper positions by resilient clamps 42. Electrical conductors generally designated at 45 connect the batteries in series with motor 46. The circuit diagram is shown in Fig. 5. This circuit can be made inoperative by merely removing either of the batteries 40 or by the operation of any suitably placed switch 47.

The batteries 40 are connected in series as shown in Fig. 5. This allows the removal of one battery to break the circuit. The series arrangement also increases the voltage available to the battery. If for any reason, it is desired to operate the lure in an opposite direction, the batteries may be reversed and the direction of rotation of the propeller blades will automatically be reversed.

Extending from the motor 46 is propeller shaft 48, which in turn extends beyond tail portion 13, through a suitable waterproof packing 49. Attached to shaft 48 is a conventional two or three blade propeller 50 for propelling the lure through the water.

A pair of adjustable depth control stabilizers 52 are placed on either side of rear portion 14, as shown in Figs. 1 and 3. Note that the stabilizers are very close to propeller 50. At this point the stabilizers are better able to take advantage of the current developed by the propeller's action. By adjusting the stabilizers 52, as shown in Fig. 1, the rate of descent one wishes the lure to dive can be set. To set the lure for a desired depth the stabilizers can be set for a slight rate of descent and a float or cork may be attached to line 63 for the desired depth.

In place of stabilizers to give horizontal direction this invention provides a unique pivotable cylinder 56, shown in Figs. 1, 2 and 3, and particularly in Fig. 4. Cylinder 56 is pivotally mounted on rear portion 14 between elements 58, which are in turn fixedly attached to 14.

The cylinder 56 mounted in this manner can give direction to the lure by adjusting its position, as shown in Fig. 3. The cylinder also protects the propeller from foreign matter in the water, and in addition, creates disturbances and bubbles in the water, which are not present by operation of the propeller alone. Ridges, vanes, or any protuberance may be placed on the interior of the cylinder to increase its water disturbing tendencies. An example of this is shown by the vanes 59 of Fig. 4.

The directional controls designated at 56 and 52 are each attached to their respective mounting members with sufficient friction to maintain their settings while operating under water.

The lure has two eyelets attached, 61 and 62, for connection with the fishing line 63, as shown in Fig. 1. The portion of the line attached to eyelet 62 carries much of the weight of the lure. When the line is traveling away from the operator, a sharp pull on the line will cause the lure to rotate in the direction of the pull. Of course, for this operation, the operator must be offset from the line, and not directly above it.

It is to be understood that even though there is herein shown and described a preferred embodiment of the invention the same is susceptible to certain changes fully comprehended by the spirit of the invention as herein described and the scope of the appended claims.

Having described the invention, I claim:

1. A fishing lure comprising an elongated hollow housing having a front portion and a rear portion, a light source and an independent power source connected in series and both mounted in said front portion, a shaft extending from said rear portion, drive means mounted in said rear portion and operatively connected to said shaft, a propeller secured to said shaft, a horizontally adjustable cylindrical directional means mounted on said rear portion and enclosing said propeller, additional vertical directional means mounted on said rear portion and closely adjacent to said propeller.

2. A fishing lure comprising an elongated hollow housing having a front portion and a rear portion, a light source and an independent power source connected in series and both mounted in said front portion, a shaft extending from said rear portion, drive means mounted in said rear portion and operatively connected to said shaft, said drive means comprising a motor to drive said shaft and a plurality of batteries forwardly disposed in said rear portion and connected in series with said drive means, and a fishing line connecting means attached to said rear portion at a point near said front portion and beyond the center of gravity of the entire lure, whereby when said lure is traveling away from an operator, a short tug on the line will change the direction of travel of said lure.

References Cited in the file of this patent

UNITED STATES PATENTS

| | | |
|---|---|---|
| 741,581 | Humphrey | Oct. 13, 1903 |
| 1,446,816 | Taylor et al. | Feb. 27, 1923 |
| 2,559,475 | Sparkman | July 3, 1951 |
| 2,709,316 | McCabe | May 31, 1955 |